(12) United States Patent
Xie et al.

(10) Patent No.: US 8,526,811 B2
(45) Date of Patent: Sep. 3, 2013

(54) POWER MONITORING PHOTODIODE ARRAY WITH INTEGRATED, CURRENT SOURCED REFERENCE PHOTODIODE

(75) Inventors: Chuan Xie, San Jose, CA (US); Jiaxi Kan, San Jose, CA (US); Dennis Burke, Newark, CA (US); Daniel Zhu, Sunnyvale, CA (US)

(73) Assignee: Sumitomo Electric Device Innovations, U.S.A., Inc., San Jose, CA (US)

( * ) Notice: Subject to any disclaimer, the term of this patent is extended or adjusted under 35 U.S.C. 154(b) by 768 days.

(21) Appl. No.: 12/582,545

(22) Filed: Oct. 20, 2009

(65) Prior Publication Data
US 2011/0091207 A1 Apr. 21, 2011

(51) Int. Cl.
*H04B 10/08* (2011.01)
(52) U.S. Cl.
USPC ............................................. 398/25; 398/38
(58) Field of Classification Search
USPC ................................. 398/9, 38, 202, 212, 213
See application file for complete search history.

(56) References Cited

U.S. PATENT DOCUMENTS

| 4,498,001 | A * | 2/1985 | Smoot ........................ 250/214 A |
| 8,285,138 | B2 * | 10/2012 | Lewin et al. ..................... 398/16 |
| 2001/0028611 | A1 * | 10/2001 | Shibano et al. ............ 369/44.14 |
| 2002/0191263 | A1 * | 12/2002 | Hoang et al. ................... 359/189 |
| 2004/0008984 | A1 * | 1/2004 | Gerrish et al. ................... 398/25 |
| 2004/0057677 | A1 * | 3/2004 | Jacobowitz et al. ............ 385/89 |
| 2004/0100317 | A1 * | 5/2004 | Suzunaga ..................... 327/307 |
| 2006/0029338 | A1 * | 2/2006 | Rodriguez-Parada et al. . 385/94 |
| 2008/0230683 | A1 * | 9/2008 | Uo et al. ................... 250/214 A |
| 2009/0028556 | A1 * | 1/2009 | Guenter ........................... 398/38 |
| 2010/0013813 | A1 * | 1/2010 | Katoh et al. ................... 345/207 |
| 2011/0091207 | A1 * | 4/2011 | Xie et al. ........................ 398/38 |
| 2011/0188850 | A1 * | 8/2011 | Mikami et al. .................. 398/25 |
| 2011/0305452 | A1 * | 12/2011 | Tosaki ............................ 398/34 |

* cited by examiner

*Primary Examiner* — Nathan Curs
*Assistant Examiner* — Tanya Ngo
(74) *Attorney, Agent, or Firm* — Venable LLP; Michael A. Sartori; Tamatane J. Aga (57) ABSTRACT

A photodiode array includes a plurality of monitoring photodiodes capable operating in a voltage mode configuration each able to provide a voltage indicating an intensity of an incident light. Integrated with the monitoring photodiodes is a reference diode configured to produce reference voltages in response to reference currents supplied to that diode. The monitoring photodiodes and the reference diode may be integrated and have the same current-voltage characteristics and the same temperature, for example by fabricating them on the same substrate. The reference diode is supplied with the reference currents in dark manner, meaning without incident light impinging on the reference diode. The resulting reference voltages, the reference source currents, and the measured photo-voltage from the monitoring photodiodes are than used to determine an optical power value at any temperature within the operation temperature range.

13 Claims, 6 Drawing Sheets

POWER MONITORING PHOTODIODE ARRAY WITH INTEGRATED, CURRENT SOURCED REFERENCE PHOTODIODE

BACKGROUND OF THE DISCLOSURE

1. Field of the Disclosure

The disclosure relates generally to power monitoring techniques for optical transmitters and, more particularly, to photodiode arrays operating in voltage mode and with an integrated reference photodiode.

2. Brief Description of Related Technology

Many communication systems transmit massive amounts of data through an optical networking infrastructure, such as that used by local and long-distance carriers, and Internet service providers. Recently, content providers and other companies have begun building their own internal, optical networking infrastructure.

Some optical networks use optical transceivers that allow for simultaneous and direct communication between users. These transceivers commonly include an optical transmit portion that converts an electrical signal into a modulated light beam that is coupled to one end of an optical fiber, and a receive portion that receives an optical signal from the other end of the optical fiber and converts it into an electrical signal. Parallel optical transceivers are a class of such devices that allow for simultaneous data transmission over an array of optical fibers in parallel. The typical parallel optical transceiver has a semiconductor laser array (e.g., a vertical cavity surface emitter laser (VCSEL) array) for transmission and PIN photodiode array for reception, where a parallel optical ribbon fiber, inserted into the optical transceiver, couples to either the VCSEL array or the PIN diode array.

It is commonly known that optical transmitters require constant or near constant monitoring of power levels. VCSELs, like other laser sources, are susceptible to natural performance degradation over a lifecycle (e.g., a reduction in optical power for a given drive current/voltage), and temperature-dependent operation. These susceptibilities can produce unwanted variations in power levels, and thus monitoring is desired.

To compensate for power level fluctuations, optical transceivers often use power monitoring systems comprising photodiodes that measure light intensity from the output of the VCSELs, for example, from a portion of a VCSEL's modulated output light beam. The photodiode array may be formed as part of a power control loop in a closed loop configuration, typically implemented in an all digital configuration with a digital readout or other scanning circuit that scans intensity data and provides it to a VCSEL drive circuit. In some implementations, all such functionality is implemented in a signal processing circuit on the optical transceiver.

The conventional way of optical power monitoring in an optical transceiver is to convert the photocurrent from the monitoring photodiodes to a voltage, which is then measured through the ND converter of a microprocessor in the optical transceiver. At the simplest end, the current-to-voltage conversion is achieved using a resistor at each photodiode. Other techniques use more complex unit cell circuitry (i.e., circuitry repeated at each photodiode), including trans-impedance amplifiers and buffers. Including additional resistors or other, more complex unit cell circuits presents a substantial problem to designers of small form factor (SFF) optical transceivers, where space is very limited. Moreover, the trans-impedance gain of the current-to-voltage conversion circuitry must be careful chosen, with a maximum value to avoid saturation and a minimum value that avoids quantization errors in the A/D converter of the microprocessor. There is a trade off between performance and long control loop scan times and the voltage applied across each PIN diode.

SUMMARY OF THE DISCLOSURE

The present invention provides using photo-voltage measurement instead of photocurrent for optical power monitoring, for example, to reduce component count on a sensor device. In the illustrated configurations, this photo-voltage measurement also has the benefit of wider dynamic range on the measured optical power. The temperature dependence of photo-voltage is removed through the use of a (dark) reference diode that is selectively supplied with two reference currents, and from which two reference voltages can be determined so temperature calibration of monitoring photodiodes is not necessary.

In accordance with one aspect of the disclosure, a sensor device comprises a plurality of diodes comprising (1) monitoring photodiodes that are configured to operate in a voltage mode configuration in which each monitoring photodiode provides a voltage indicating an intensity of an incident light, and (2) a reference diode configured to produce reference voltages in response to respective reference currents supplied to the reference diode, where the reference diode and the monitoring photodiodes are configured to have a like voltage-current relationship over a range of like temperature values, such that an optical power measurement can be determined from the measured voltage indicating the intensity of the incident light and the reference voltages and reference currents, independent of temperature.

In accordance with another example, an optoelectronic module comprises: a VCSEL array mounted on a base and comprising N VCSELs each for producing a modulated optical signal, where N is an integer greater than 1; a diode array mounted on the base and comprising N monitoring photodiodes configured to operate in a voltage mode configuration in which each monitoring photodiode provides a voltage indicating an intensity of an incident light, the photodiode array further comprising a reference diode configured to produce reference voltages in response to respective reference currents supplied to the reference diode, where the reference diode and the N monitoring photodiodes are configured to have a like voltage-current relationship over a range of like temperature values, such that an optical power measurement can be determined from the measured voltage indicating the intensity of the incident light of each monitoring photodiode and the reference voltages and reference currents, independent of temperature; and an optical assembly adjacent the base and configured to receive the modulated optical signals and produce from each a modulated output signal and a detection signal, wherein the optical assembly is configured to couple each of the detection signals to one of the N monitoring photodiodes.

In accordance with another aspect of the disclosure, a method for measuring incident light on a diode array having a plurality of monitoring photodiodes, comprises: configuring the monitoring photodiodes to operate in a voltage mode configuration in which each monitoring photodiode, when operating in a monitoring mode, provides a voltage indicating an intensity of an incident light; operating at least one reference diode in a reference update mode in which the reference diode produces reference voltages in response to respective reference currents supplied to the reference diode, where the reference diode and the monitoring photodiodes are configured to have a like voltage-current relationship over a range of like temperature values; and for each of the monitoring photodiodes determining an optical power value from the voltage indicating the intensity of the incident light and the reference voltages and reference currents of the reference diode, and independent of temperature.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

While the disclosed methods and apparatus are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Numerous examples are described of sensor devices that include diodes, some of which operate as channel monitoring photodiodes for measuring a optical power representing a signal, light beam, etc. and at least one of which operates as a reference diode for measuring for an operating characteristic of the monitoring photodiodes. As discussed, the monitoring photodiodes are operated in a voltage mode where a photovoltage is measured, instead of photocurrent, for optical power monitoring. This helps dramatically reduce component count on the circuit board of the sensor. Furthermore, this photo-voltage configuration has the benefit of wide dynamic range, allowing for greater detection of optical power measurements of different amounts. Further still, disclosed below is the use of a reference diode to remove the temperature dependence of these monitoring photodiodes through the use of supplied reference currents and measured reference photovoltages. This may eliminate the need for separate over temperature power calibration in an optical transmitter.

While the sensor devices are described as used in optical transmitters (as part of a power monitoring system), the present techniques may be used in any number of applications. These include optical receivers and optical transceivers, two-dimensional image sensors, infrared detectors, and other semiconductor photodiode devices.

FIG. 1 illustrates a block diagram of an example configuration of a sensor device 1 that may be used in an optical transmitter for an optical communication network, such data links between supercomputers, servers and mass data storage units. The sensor 1 includes a laser array 2, which is illustrated as having a plurality of N lasers each capable of producing a light beam as an output. The lasers of the array 2 are driven by a drive circuit 4, which is capable of supplying a separate, modulated drive current to each of the N lasers (over a communication signal path 5) for producing modulated optical signals that are coupled into fibers of an optical fiber array 6.

Figure 1A:
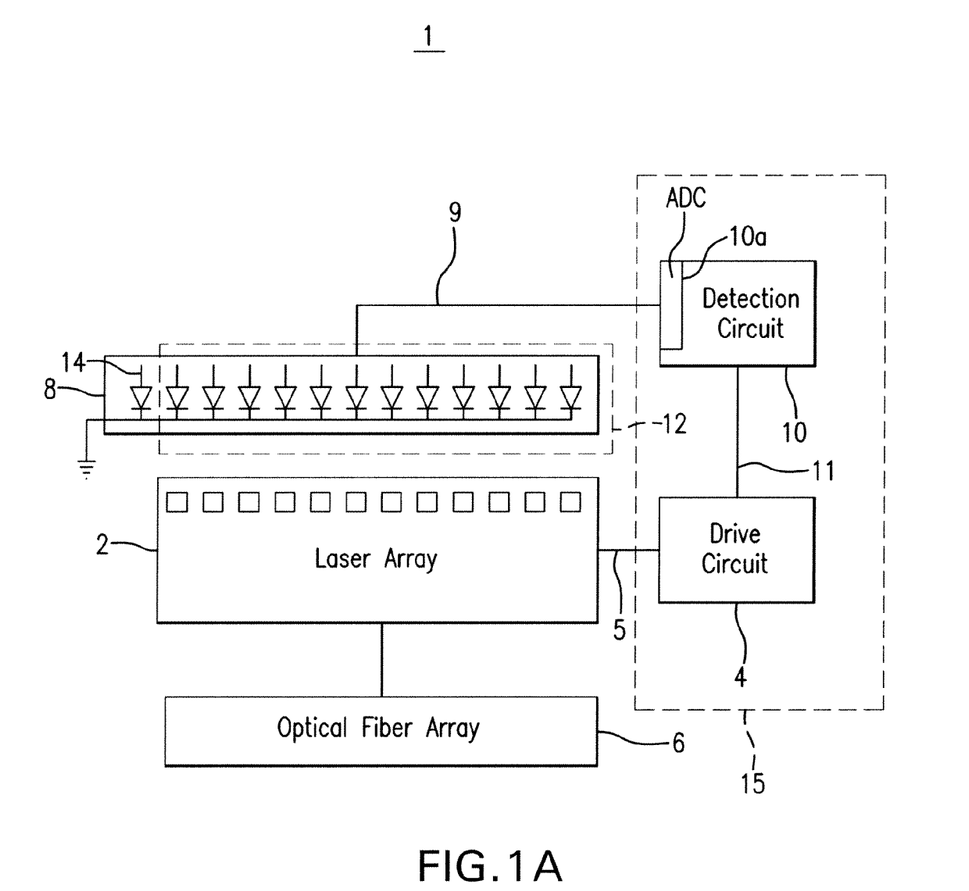
FIG. 1A illustrates a high level block diagram of a photodiode sensor device in accordance with an example herein.

A diode array 8 contains M monitoring photodiodes that are directly coupled to a detection circuit 10, and more particularly directly connected to an A/D converter (ADC) 10a of the detection circuit 10. In the illustrated example, the diodes of the array 8 are in a common cathode configuration, with the cathode connected to ground. A first set of photodiodes 12 operates as M channel monitoring photodiodes configured to measure intensity of respective output channels from the N lasers of the array 2. A second set of diodes 14 operates as reference diodes (only one in the illustrated example) capable of measuring an operating condition of the array 8. In the illustrated configuration, where N=12, there are M=12 monitoring photodiodes 12 and only one reference diode 14. As discussed below, the reference diode 14 may be considered a dark diode, or dark photodiode, in various applications herein.

With conventional power monitoring systems, a current-to-voltage conversion was performed through resistors coupled to the cathodes of each photodiode. For M photodiodes, M resistors would have been needed; and each monitoring photodiode would have been provided with a supply voltage ($V_{cc}$) across the photodiode and its respective resistor. A detected photocurrent through the resistor was provided to an ADC which then determined a voltage and corresponding optical power. The value of these resistors had to be carefully chosen, which meant that the resistors had to be precise. For an accurate measurement of the photocurrent (and optical power), the photodiode diode needed a reverse bias voltage to be applied ($R \times I_{photo} < V_{cc}$). For the microprocessor to correctly interpret the detected optical power, that reverse bias voltage could not exceed $R \times I_{photo} < V_{ref}$ of the ADC. Assuming the microprocessor's supply voltage was $V_{cc}$, that is $V_{ref} < V_{cc}$, the maximum photocurrent detectable across each photodiode would be $I_{max} < V_{ref}/R$. This translated into a maximum resistor value of $R < V_{ref}/I_{max}$. If the resistors value (R) was too low, however, the measurement accuracy would be compromised by the "quantization error" of the ADC. The result of such conventional configurations was that the power measurement range usually did not significantly exceed one decade (or 10 dB), unless an expensive ADC was used having an ultra low quantization error.

The configuration of FIG. 1A, however, is able to overcome these deficiencies by detecting the received optical power (intensity) through a direct measurement of a photo-voltage on the photodiodes 12, instead of a photocurrent. By operating the photodiodes 12 in a voltage mode, the anode of each photodiode 12 may be directly connected to the ADC of a microprocessor, i.e., without any additional, intervening components such as precision resistors or more complex unit cell circuitry (e.g., op-amps, buffers, or multiplexers). This direct connection with the ADC 10a, over signal path 9, allows the detection circuit 10 to detect the voltage across each monitoring photodiode 12 in a voltage mode configuration.

The range of the photo-voltage measured from the photodiodes 12 for a given range of input optical power and a given range of temperature is (weakly) dependent on the material and design of the photodiodes, and more strongly dependent on the size of the detectors. Smaller detectors have higher voltages. Channel spacing and cross-talk put an upper bound on the size of the monitoring detectors. For 250 μm channel spacing, typical of parallel optical transceivers, the detector diameter usually does not exceed 100 μm. For a detector of this size, the photo-voltage ranges from approximately 0.5 V (high temperature, low optical input) to 1.5 V (low temperature, high optical input). This falls comfortably within the detection range of a typical ADC. The photo-voltage to optical power relation has a slope of approximately 12 mV/dB (slightly dependent on temperature). Assuming $V_{ref}$=2.5 V, a low end 8-bit ADC will offer a quantization accuracy of <1 dB, which may be sufficient for most power monitoring applications. If more accuracy is desired, a 10-bit ADC could be used. Lower ADC reference voltage would benefit accuracy without increase in number of bits.

Figure 1B:
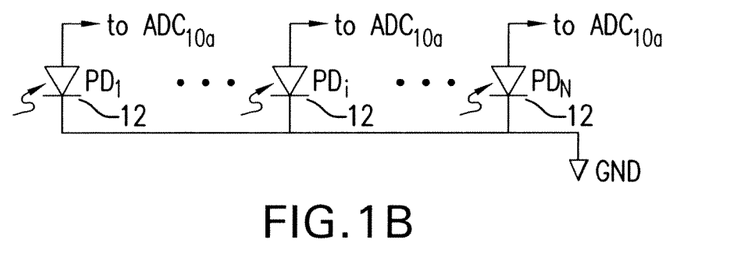
FIG. 1B illustrates a more detailed circuit diagram of channel monitoring photodiodes of the configuration of FIG. 1A.

FIG. 1B illustrates a more detailed depiction of the photodiodes 12 showing the direct connection (via path 9) to the ADC 10a. Because the voltage measured across each photodiode 12 is linearly related to received optical power, in dBm (as indicated below), this configuration has a wider dynamic range than prior systems. The configuration may accurately measure optical power over a 3-decade range (e.g. from below −30 dBm to above 0 dBm).

Unlike photocurrent, which is largely temperature independent, photo-voltage as measured from the photodiodes 12 is sensitive to temperature. Although in some examples the temperature dependency can be carefully calibrated out, over temperature calibration is not preferred because it greatly increases the manufacturing cost. Therefore, the photodiode 14 is used as a reference diode, kept in the dark, to remove the temperature dependency without over temperature calibration.

Figure 1C:
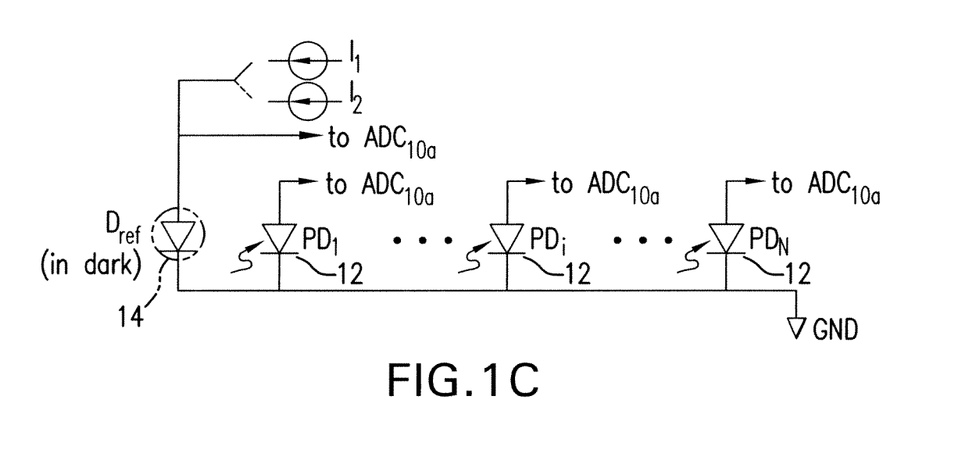
FIG. 1C illustrates a more detailed circuit diagram of a reference diode of the configuration of FIG. 1A.

FIG. 1C illustrates the direct connection of the reference diode 14 to the ADC 10a. To effectively compensate for temperature dependence in the voltage measured across monitoring diodes 8, a voltage-current relationship is determined. There are two temperature dependent parameters (namely, the slope and the intersect) that affect the measured voltage and its relationship to the received optical power (in dBm). Therefore, to properly calibrate the reference diode 14, the two voltages ($V_1$ and $V_2$) must be determined under two respective, known forward bias currents ($I_2$ and $I_2$). The bias currents are preferably provided to the reference diode 14 through a current source in a microprocessor and represent a high current source ($I_{1,HIGH}$) and a low current source ($I_{2,LOW}$) to establish the linear bounds of the current-voltage data plots. An additional ADC in the microprocessor receives the high and low reference voltages ($V_{1,\ HIGH}$ and $V_{2,\ LOW}$) corresponding to the forward bias currents ($I_{1,\ HIGH}$ and $I_{2,\ LOW}$), respectively. This establishes the calibration bounds for linear determination of optical power from the measured voltage of the monitoring photodiodes 12. Knowing $V_1$, $V_2$, $I_1$ and $I_2$, the received optical power (for any channel) can be calculated at any temperature without additional calibration.

For measurement accuracy, the reference diode 14 should have the same temperature and current-voltage relationship as the channel monitoring photodiodes 12. Therefore, preferably, the reference diode 14 is on the same array as the channel monitoring photodiodes 12, although this need not be the case. The derivation of the linear relationship between the measured photo-voltage and the optical power is now provided.

For the reference diode 14 supplied with a reference current $I_1$ (assuming all photocurrent and reference current are significantly higher than the dark current of the photodiode $I_d$, which is also known as the diode's reverse saturation current) that reference current can be expressed as a function of the following parameters, $$I_1 = I_d e^{\frac{qV_1}{nkT}} \text{ or } \ln(I_1) = \ln(I_d) + \frac{qV_1}{nkT} \tag{1}$$

where $I_d$ is the dark current, q is the electron charge, k is the Boltzmann constant and n is a material dependent parameter. For the reference (dark) photodiode 14 supplied with a reference current $I_2$ $$I_2 = I_d e^{\frac{qV_2}{nkT}} \text{ or } \ln(I_2) = \ln(I_d) + \frac{qV_2}{nkT}. \tag{2}$$

For the monitoring photodiodes 12, the current values may be expressed as $$I_{ph} = I_d e^{\frac{qV_{ph}}{nkT}} \text{ or } \ln(I_{ph}) = \ln(I_d) + \frac{qV_{ph}}{nkT} \tag{3}$$

where $V_{ph}$ is the measured photo-voltage, and $I_{ph}$=RP (the responsitivity times the optical power) is the photocurrent.

From Expressions (1) and (2), the following relationship holds $$\ln(I_2) - \ln(I_1) = \frac{q(V_2 - V_1)}{nkT} \tag{4}$$

From Expressions (1) and (3), the following relationship holds $$\ln(I_{ph}) - \ln(I_1) = \frac{q(V_{ph} - V_1)}{nkT} \tag{5}$$

From Expressions (4) and (5), the following relationship holds $$\frac{V_{ph} - V_1}{V_2 - V_1} = \frac{\ln(I_{ph}) - \ln(I_1)}{\ln(I_2) - \ln(I_1)} \tag{6}$$

Expression (6) does not explicitly contain temperature, nor does the expression contain the material dependent parameter n. Therefore, rewriting Expression (6) one gets $$\ln(I_{ph}) = \ln(I_1) + \frac{V_{ph} - V_1}{V_2 - V_1} \ln\left(\frac{I_2}{I_1}\right) \tag{6'}$$

Or

-continued $$P_{dBm} = 10 \times \log\left(\frac{I_1}{R}\right) + 10 \times \frac{V_{ph} - V_1}{V_2 - V_1} \log\left(\frac{I_2}{I_1}\right) \quad (7)$$

Expression (7) is the linear relation between photo-voltage $V_{ph}$ and optical power $P_{dBm}$ in dBm. In expression (7), the currents are in mA; and the responsivity R is in A/W (or mA/mW). As shown, measured photo-voltage ($V_{ph}$) on a monitoring photodiode 12 can be used to determine an optical power ($P_{dBm}$) for a corresponding VCSEL of array 2, once the measured reference voltages ($V_1$ and $V_2$) are determined from the reference currents and $I_2$ supplied to the photodiode 14 during a reference update mode. Doing this, removes the temperature effect on the measured photo-voltages, during run-time and thus without the need for separate temperature calibration during manufacturing.

The photodiode array 8 operates in two modes. A monitoring mode is one in which monitoring photodiodes 12 measure intensity from output energy from the lasers, and the detection circuit 10 samples their output voltage, while the reference diode 14 idles. A reference update mode is one in which the voltages of photodiodes 12 are not processed by the microprocessor, but rather the reference diode 14 is activated: reference currents are provided to it and the respective voltages across it measured. The photodiodes 12 and 14 may be operated in an open circuit voltage configuration, which has sufficiently high impedance that trans-impedance amplifiers are not required, but instead a direct analog connection with the detection circuit 10 is used.

During the monitoring mode, the detection circuit 10 operates the photodiodes 12 in a voltage mode in which the detection circuit 10 measures a voltage output across each of the photodiodes 12, where that voltage indicates the intensity (and ultimately the optical power) of incident light on each photodiode 12. In the illustrated configuration, the detection circuit 10 receives the direct analog input from the photodiodes 12 and 14 to the ADC 10a. In addition to being in a common cathode configuration, the monitoring photodiodes 12 and the reference diode 14 preferably have the same or similar voltage-current responsiveness over a desired operating temperature range. Thus, it can be expected that the reference voltages produced by the reference diode 14, during the reference update mode, would have similar characteristics to the voltages measured from any of the monitoring photodiodes 12 during a monitoring mode.

The reference voltage from reference diode 14 varies with the reference current and with temperature. Therefore, by measuring the voltage of the diode 14 when no incident light is being measured by the array 8 but rather the diode 14 is supplied with reference currents supplied in an alternated manner, the circuit 10 can either determine the operating temperature of the reference diode 14, and thus preferably that of the monitoring photodiodes 12 thermally coupled thereto, or use the reference voltages and reference currents from the reference diode 14 to directly determine the optical power corresponding to the measured voltage from the monitoring photodiodes 12, as measured during the monitoring mode. Suitable thermal coupling can be achieved by having the photodiodes 12 and reference diode 14 in close proximity, for example formed on the same semiconductor chip.

In the illustrated configuration, the detection circuit 10, ADC 10a, and the driver circuit 4 are coupled together to form a plurality of power control loops, each comprising one laser from array 2 and one detection photodiode from array 8. The detection circuit 10 may be configured to scan the monitoring photodiodes 12 over a range of sampling rates, preferably at sampling rates less than the data rate of the modulated optical signals from the lasers. An example sampling rate is 1 ms or longer, which is sufficient to measure for most operating condition changes such as changes in temperature. In the illustrated example, the photodiodes are typically measuring intensity averaged over numerous modulation cycles of the laser, i.e., less than 1 GHz.

The detection circuit 10, for example, may sample the voltage values of the photodiodes 12 during a monitoring mode at a different sampling rate than that of the reference diode 14 during a reference update mode. The sampled voltages from the monitoring photodiodes 12 corresponds the output power (measured in dBm) of the lasers. The sampled voltages from the reference diode 14 correspond to a voltage-current relationship that depends upon the operating temperature of the photodiode array 8. The latter sampled values are provided to the driver circuit 4 which may, in response, determine offset control signals for adjusting the drive signals provided to the various lasers. These offset control signals may contain, for example, a DC offset voltage that is applied to the modulated RF drive signal (e.g., voltage) applied to one or more lasers, to thereby compensate for unwanted temperature dependent increase/decrease in the output power from the laser(s).

In some examples, the drive circuit 4 may also be configured to receive current or voltage feedback measurements from each of the lasers, as well as the output from a thermal electric controller (TEC) coupled to the laser array, all of which may be used by the drive circuit 4 to control laser operation by adjusting the power levels.

While in the illustrated example the detection circuit 10 and drive circuit 4 are coupled directly together (via a signal path 11) and form part of the same transmitter device, in other configurations one or both of the circuits 10 and 4 may be external to the device. For example, in an open loop configuration, a remote device or signal processor may be coupled to receive the monitored voltages directly and produce offset control signals for a drive circuit within the device. In the illustrated example, the detection circuit 10, the ADC 10a, and the drive circuit 4 are all formed in an integrated circuit, e.g. a microprocessor 15, that includes a current source for driving the reference diode 14.

The reference diode 14 is blocked from receiving incident light, preferably by placing a metallized layer over the photodiode 14 during a chip fabrication step or by spacing the monitoring photodiode a sufficient distance away from the incident light. In other examples, a shutter may be used to selectively pass or block light on the photodiode array 8 as a whole or only over the photodiode 14. In the example of the latter, by using a shutter or other active blocking mechanism, the reference diode can be implemented by using one of the monitoring photodiodes. Because the reference voltages from the reference diode are intended to result from reference currents, those voltages can be measured using a monitoring photodiode, so long as that monitoring photodiode is not receiving incident light and has dissipated its detection voltage. Such operation can be achieved during an off cycle of the device 1, where one of the N channel lasers is not operating or not currently transmitting, by supplying reference currents to those monitoring photodiode during that off cycle.

While the illustrated configuration is that of a 1×N (1×M) array, in other implementations, such as an image sensor, an M×N image array, where N is the number of reference and monitoring photodiodes in a row and M is the number of rows of each. In such a configuration, there can be one reference diode for each row of monitoring photodiodes, for example.

Figure 1D:
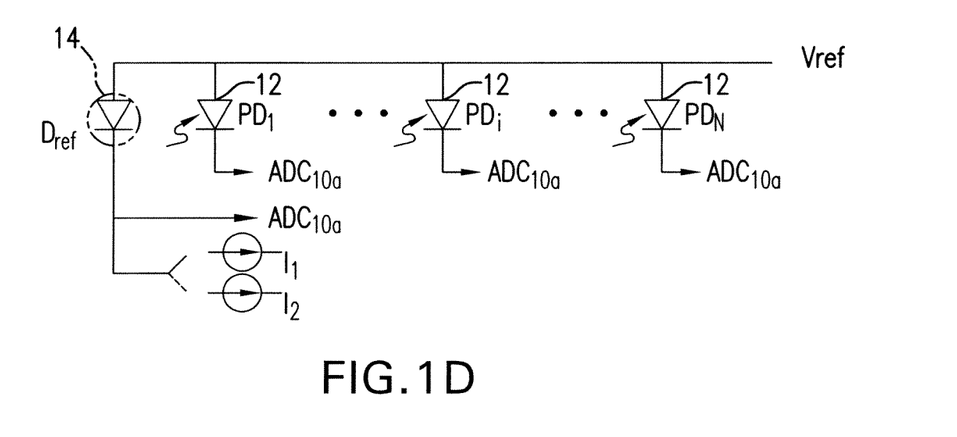
FIG. 1D illustrates a detailed circuit diagram of a common anode configuration for monitoring photodiodes and a reference diode.

Furthermore, the illustrated configuration is that of a common cathode configuration for the photodiode array 8. However, in other examples a common anode configuration can be used. For example, whereas the common cathode configuration does not rely upon additional passive components, but rather may be directly coupled to an ADC and current source of a microprocessor, one could employ a common anode configuration instead. FIG. 1D illustrates a common anode configuration for the monitoring photodiodes 12 and the reference diode 14. The configuration is similar to that discussed above, except the diodes 14 and 12 are connected in a common anode configuration. This configuration is particularly useful when the photo-voltage is higher than the reference voltage, $V_{ref}$, of the ADC (e.g. very small diodes) and/or when the reference currents are provided by current sinks (instead of current sources). In implementation, two precision resistors (not shown) connected to the open-collector outputs of a microprocessor could be used to sink the current and measure voltage relative to the top rail instead of relative to ground. This would allow for using microprocessors that do not have ADC's built in, although in the illustrated example an output from cathode 14 is connected to the ADC 10a. In some examples, a buffer amplifier (e.g., a voltage follower receiving $V_{ref}$ as an input and with $V_{cc}$ as a positive power supply) may be used to buffer the $V_{ref}$ connected to the common anode. The injected reference current would then be a sink current instead of a source current.

Figure 2:
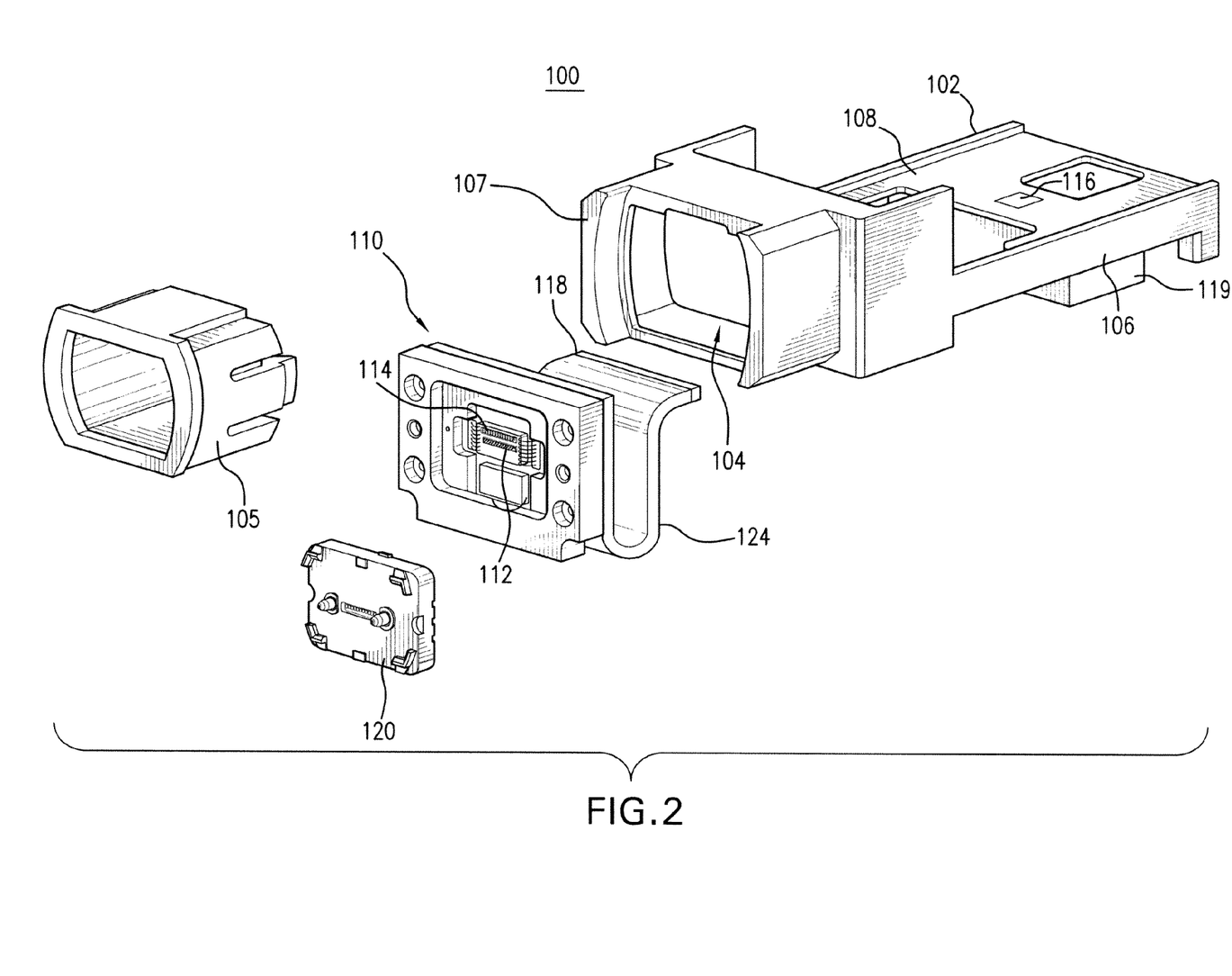
FIG. 2 illustrates an exploded view of a pluggable parallel optoelectronic module having a photodiode sensor like that of FIG. 1.

FIG. 2 illustrates an example implementation the techniques above in a parallel optoelectronic module 100. The module 100 may be used as an optical transmitter, or transceiver, for communication over parallel optical data communication links, such as a multi-mode fiber ribbon cable. The optoelectronic module 100 may be a pluggable device, for example, "hot pluggable" into a rack mounted line card network unit or chasses of a data system unit. Standard form factors set forth in Multiple Source Agreements (MSAs) provide standardized dimensions and input/output interfaces that allow devices from different manufacturers to be used interchangeably. Some of the more popular MSAs include XEN-PAK (see www.xenpak.org), X2 (see www.X2msa.org), SFF ("small form factor"), SFP ("small form factor pluggable"), XFP ("10 Gigabit Small Form Factor Pluggable", see www.XFPMSA.org), and the QSFP ("Quad Small Form-factor Pluggable," see www.QSFPMSA.org).

The optoelectronic module 100 has a 1×N configuration, where N=12 and represents the number of transmitting channels. While the module 100 is described as an optical transmitter, a similar module operating as an optical transceiver would have both transmit and receive channels.

The module 100 uses a VCSEL array, although other laser and light sources may be used. As a VCSEL array device, the module 100 preferably operates at channel wavelengths of between 750 to 980 nm, most preferably at channel wavelengths centered at or about 850 nm and using data rates of up to approximately 10 Gbps per channel.

The module 100 includes a pluggable housing 102 having a receptacle end 104 that is sized to accept a connector of an optical fiber assembly and a base end 106. The receptacle end 104 includes a fiber connector insert 105 that fits within a port 107 and is sized to allow an external optical fiber to be connected thereto using a standard connector, such as a ribbon fiber type MPO connector. Standard fiber ribbons meeting any of the industry standards, such as Telcordia or IEC standards, may be used. Furthermore, while the optoelectronic module 100 is preferably a 12 channel module, connecting with a 12 channel ribbon fiber, ribbons of any dimension 4, 6, 8, 12, 24, 36 or otherwise may be used depending on the size of the VCSEL array.

The base end 106 has a recess 108 that is configured to partially support a portion of a flex circuit board containing a laser/photodiode module 110 that includes a VCSEL array 112 and a photodiode array 114—the array 114 is described as a photodiode array for convenience sake, as it will be recognized that the reference diode in the array may not be a photodiode depending on different variations and configurations. Depending on the implementation, the base end 106 may also provide support for a rigid circuit board, a microprocessor 116 and/or PIN connector assembly 118 of a flex circuit board. In the illustrated example, the microprocessor 116 is a signal processing circuit coupled (e.g., via the PIN connector 118) to modulate the operation of the VCSELs and coupled to the photodiode array 114 for producing power adjustment (offset) signals for the VCSELs in the array 112. For example, the microprocessor 116 may be coupled to a reference diode (discussed above) and is used to normalize the measured intensity data from the monitoring photodiodes of array 114 by measuring an operating temperature or other operating parameter of the array 114. The microprocessor 116 may use the normalized intensity data to determine set points for operating the VCSELs of the array 112, for example, where one or more VCSELs are operating at undesired deflated or elevated output power levels. The microprocessor 116, for example, may set individual offset drive voltages for the VCSELs to compensate for changes in temperature operation, degradation over time, or other variable conditions. The microprocessor 116 may be coupled to a detection circuit (not shown) implemented as a QFN-type integrated circuit mounted to a flex circuit board.

The end 106 may be a thermally conductive substrate that supports an optional heat sink 119 opposite the circuit elements for temperature controlled operation. The housing 102 (as well as any outer casing or flex circuit capping plate) may be constructed of die-cast or milled metal, preferably die-cast zinc, although other materials also may be used, such as specialty plastics and the like. Preferably, the particular material used in the housing construction assists in reducing electromagnetic interference (EMI).

Disposed between the laser/photodiode module 110 and the MPO insert 105 is a lens assembly 120, which is mounted within the housing 102 and aligned to receive modulated optical signals from the VCSELs 112 and convert a portion thereof into monitoring signals that the lens assembly 120 couples back to the photodiodes 114.

The lens assembly 120 may have a holder and lens array having a plurality of lenses in an array configuration and aligned to couple modulated light beams from the VCSELs to fibers in a ribbon fiber assembly connected to insert 105. More specifically, the lens assembly 120 is configured to receive a modulated optical signal from each VCSEL and convert that signal into a modulated output signal and a monitoring signal, where the latter is coupled to one of the detection photodiodes 130 (see FIG. 4). The lens assembly 120 may have an integrated design with ribbon fiber receptacles, that allow the lens assembly to provide a pluggable backstop for the insert 105. To split the output from the VCSELs, the lens array 150 may use a diffractive lens array or other lens array such as one containing beam splitter/coupling elements, prism reflectors, fiber splitters, or facet beam splitters.

Figure 3:
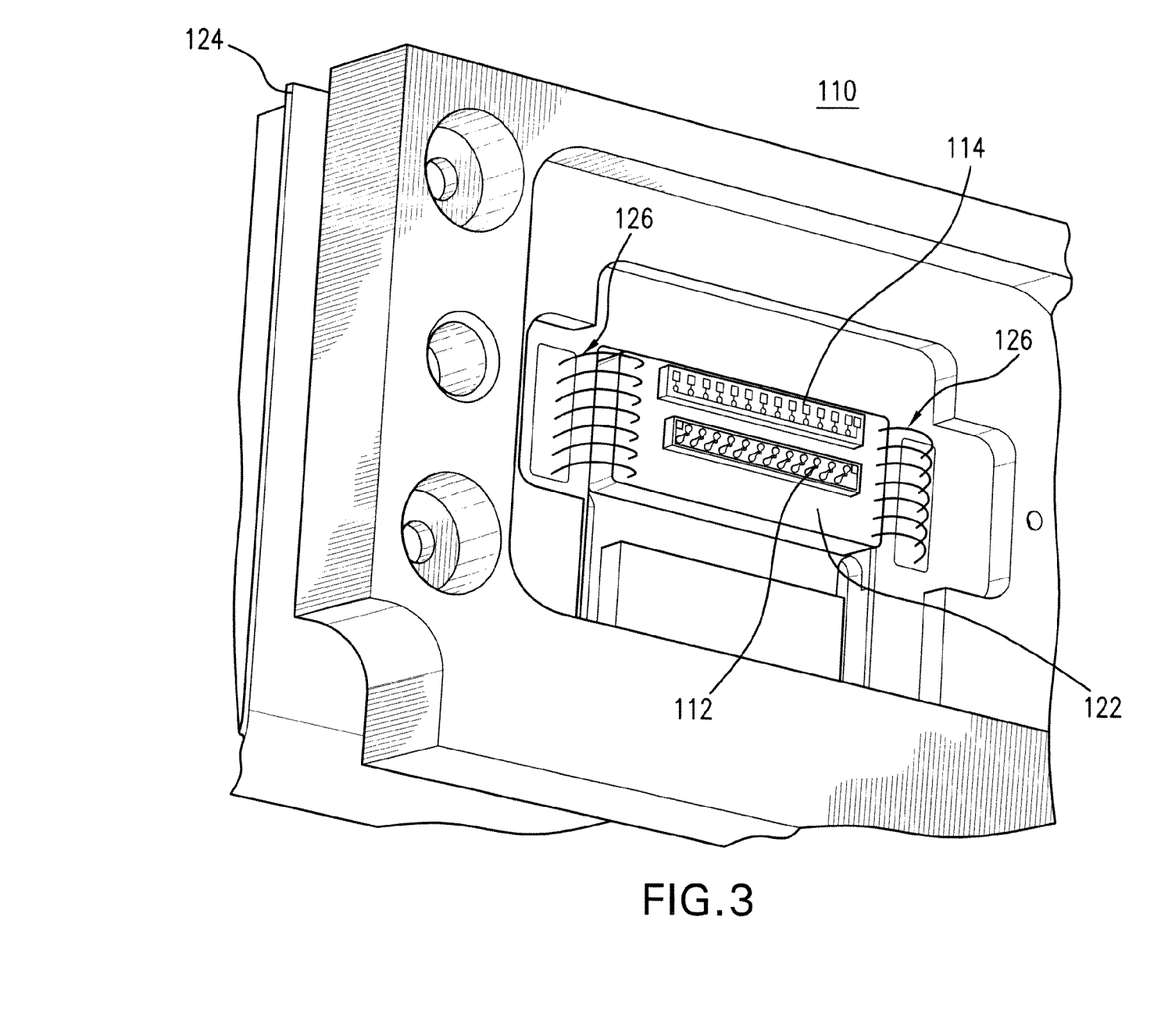
FIG. 3 is a perspective view of a flex circuit board having a laser array and photodiode array assembly in accordance with an example.

FIG. 3 provides a more detailed view of the laser photodiode module 110. The VCSEL array 112 and the photodiode array 114 are both attached to, and thermally coupled with, a heat sink plate 122 that is affixed to a flex circuit board 124.

The support plate 122 may be a semiconductor support having electrical traces coupling each of the VCSELs in the array 112 and each of the photodiodes in the array 114 to wire bond leads 126 electrically coupled to the flex circuit board 124 and the PIN connector 118, which may be on a distal portion of the circuit board 124. In the illustrated example, the VCSEL array 112 has 12 VCSELs and the photodiode array has 13 photodiodes, some for monitoring optical signals from corresponding VCSELs, and one operating as a separate monitoring photodiode for monitoring an operating characteristic of the VCSEL array 12, such as the thermal temperature. While separately-fabricated lasers and photodiodes may be used, the VCSEL array 112 is preferably a single manufactured contiguous semiconductor array (a wafer formed array) or assembly of batch-fabricated VCSEL chips. The photodiode array 114 may be formed in a similar manner. Preferably, the two arrays 112, 114 are maintained in a sufficiently close proximity such that the thermal conditions of the later are experienced by the former. In other implementations, for example, where there are multiple operating-characteristic monitoring photodiodes, photodiodes may be thermally coupled to fewer than all VCSELs. Furthermore, while the operating characteristic of the VCSELs is described as temperature, other characteristics may be used instead, in particular characteristics that are measurable from the measured output from monitoring photodiodes.

Figure 4:
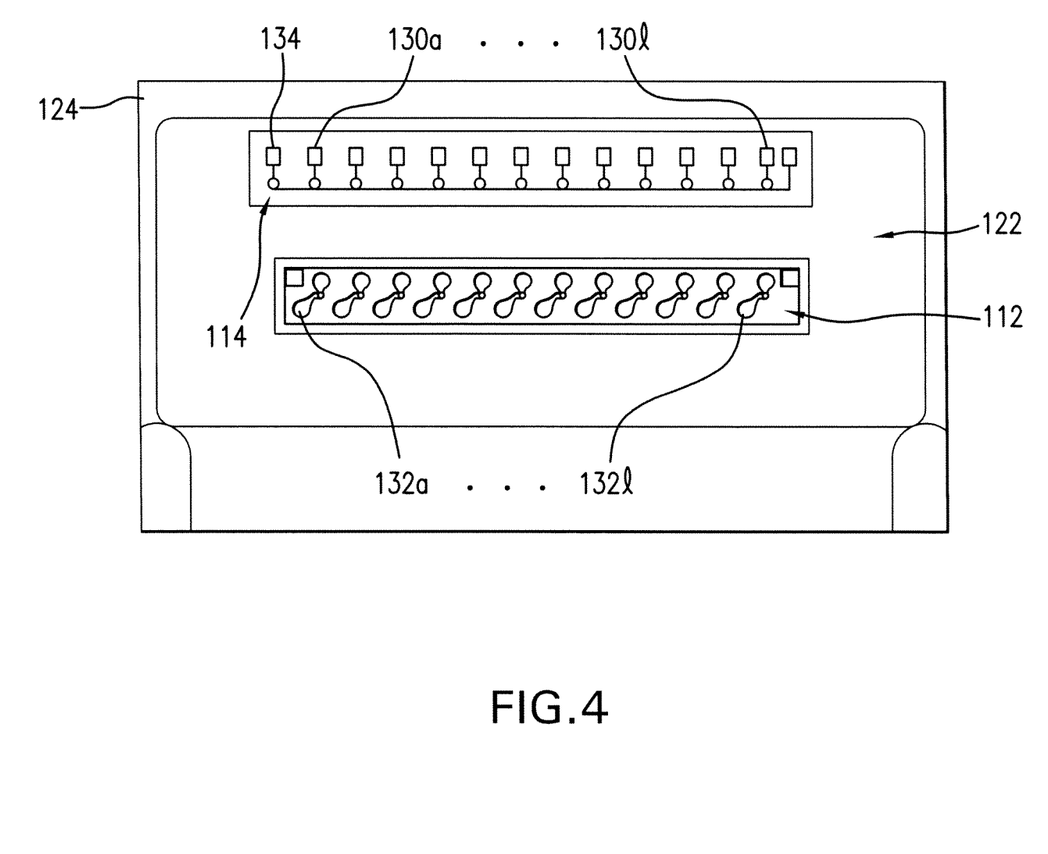
FIG. 4 is a front end view of the laser array and photodiode array of FIG. 3 having a plurality of monitoring photodiodes and a separate dedicated reference diode.

FIG. 4 illustrates the VCSEL array 112 and photodiode array 114 of FIG. 3 mounted to the heat sink pedestal 122. As illustrated, each of the twelve photodiodes 130a-130l is (vertically) aligned with one of the 12 VCSELs 132a-132l, to monitor the modulated light beam therefrom. The photodiodes 130a-130l thus monitor the modulated light beam from the VCSELs. A separate reference diode 134 is in parallel with the photodiodes 130, in a common cathode configuration, with wire leads for connecting to the microprocessor 116, for example, such as with the example configurations shown in FIGS. 1B-1D.

To keep the assembly 110 in a small package size able to more densely pack the VCSELs and photodiodes, the photodiode array 114 preferably is in an analog configuration and without dedicated pre-amplification (e.g., no trans-impedance amplifier) circuitry at each photodiode cell site. The photodiodes of the array 114 are directly connected to ADCs in the microprocessor 116, without any intervening passive or active circuit elements. The VCSEL lasers 132 may produce output levels over a range from about 10 dBm to −30 dBm. The photodiodes 130 must be sensitive enough to measure a small, fixed percentage of that output beam to detect beam intensity. Although other configurations may be implemented, in the illustrated configuration the diodes 130 and 134 are in a common cathode configuration and substantially identical such that these diodes have the same or similar voltage response to the same dark current, at least over a range of operating temperature values. Essentially, it is desired that by measuring the voltage response of the reference diode 134 where that diode has been blocked from receiving incident light, an electrical characteristic (or performance) of the diode 134 may be measured, where the measured value corresponds to that of the monitoring photodiodes 130, as well.

As discussed above, the diode 134 may be blocked from receiving incident light by depositing a metallized reflective layer over the photodiode or by using a shutter mechanism, either permanently blocking the photodiode or controllably blocking incident light through an active control.

The diode 134 may be in an open loop configuration in which the monitored voltage is supplied to a remote device or signal processor external to the device 100. While in other examples, the photodiode 134 is used in a closed loop control.

Figure 5:
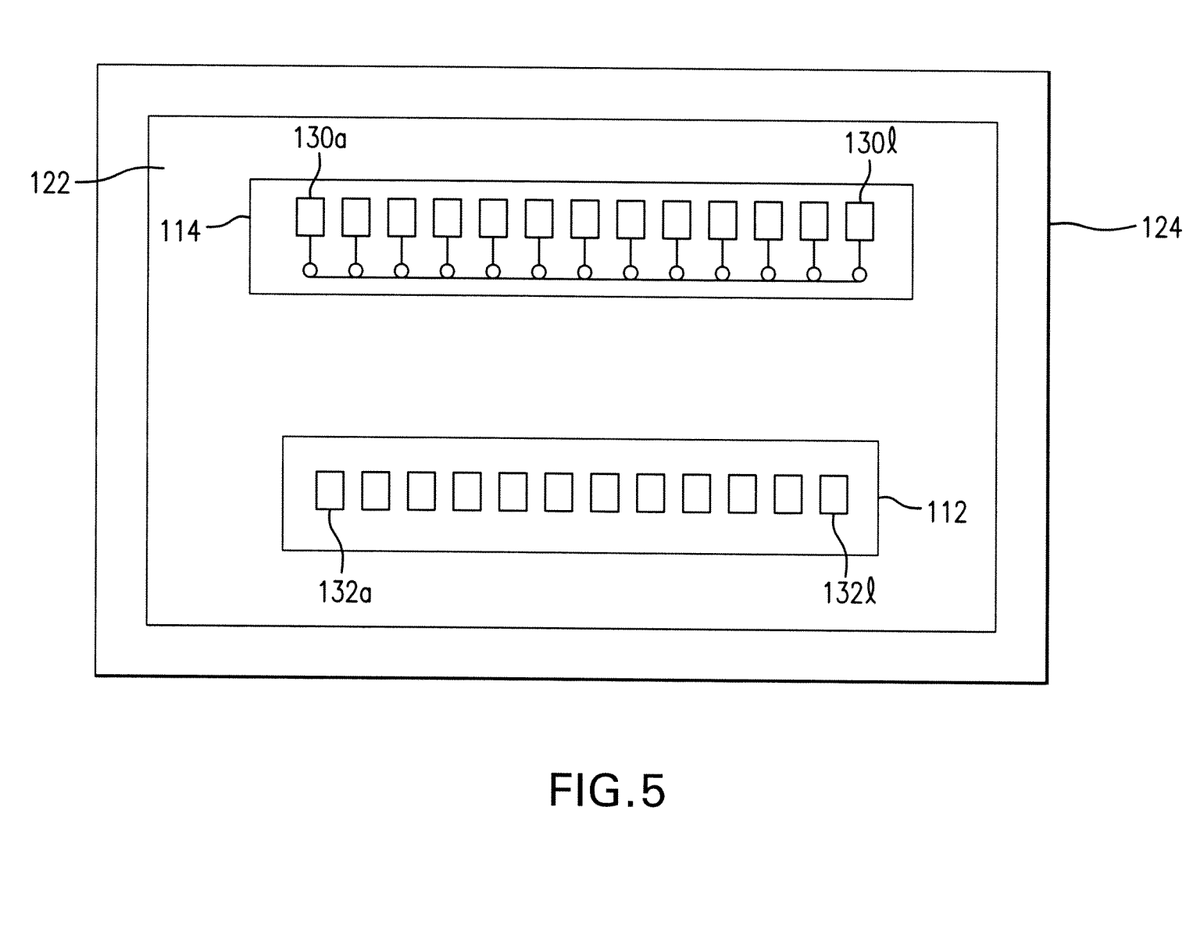
FIG. 5 is a front end view of another laser array and photodiode diode array configuration in which the reference diode is formed identical to the monitoring photodiodes on the same array.

FIG. 5 illustrates another example implementation in which the reference diode (134 in FIG. 4) is no longer a separate photodiode, but rather one of the channel monitoring photodiodes 130. In this example, an active shutter may be used to block incident light from hitting the entire array 114 during a reference update mode, at which time one or more of the photodiodes 130 are used as reference diodes, during which reference voltages are measured across the photodiode and transmitted to a signal processor for determining photodiode temperature and/or offset voltage values for controlling the power of the output from each of the VCSELs. For example, two monitoring photodiodes 130 may be each supplied a different reference current ($I_{low}$ or $I_{high}$) during a reference update mode, and then the corresponding reference voltage ($V_{low}$ or $V_{high}$) may be detected from each photodiode simultaneously. One monitoring photodiode could be used to measure the reference voltage in response to a low current drive, while the other monitoring photodiode may be used simultaneously to measure the reference voltage in response to a high current drive. In other examples a single photodiode 130 may be used to determine $V_{low}$ or $V_{high}$.

Embodiments of the subject matter and the functional operations described in this specification can be implemented in analog or digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A sensor device comprising a plurality of diodes comprising
monitoring photodiodes that are configured to operate in a voltage mode configuration in which each monitoring photodiode provides a voltage indicating an intensity of an incident light;
a reference diode configured to produce reference voltages in response to respective reference currents supplied to the reference diode, where the reference diode and the monitoring photodiodes are configured to have a like voltage-current relationship over a range of like temperature values, such that an optical power measurement can be determined from the measured voltage indicating the intensity of the incident light and the reference voltages and reference currents, independent of temperature;
a signal processing circuit having an A/D converter directly connected to the anode of each of the monitoring photodiodes and connected to the reference diode, the A/D converter measuring, over a sampling period, the voltages indicating the intensity of the incident light to each monitoring photodiode during a monitoring mode and the reference voltages of the reference diode during a reference update mode; and
a shutter configured to allow the incident light to impinge upon the monitoring photodiodes during the monitoring mode and block the incident light from impinging on at least the reference diode during the reference update mode.

2. The sensor device of claim 1,
wherein the monitoring photodiodes and the reference diode are in a common cathode configuration.

3. The sensor device of claim 1,
wherein the signal processing circuit is further configured to supply the reference currents alternately to the reference diode during the reference update mode.

4. The sensor device of claim 1,
wherein the monitoring photodiodes and the reference diode form a photodiode array, where the reference diode is blocked from receiving the incident light, and
wherein the reference voltages and the reference currents form a voltage-current response that is dependent upon temperature of the sensory device.

5. The sensor device of claim 1,
wherein the monitoring photodiodes and the reference diode are formed on a single semiconductor substrate, the sensor device further comprising a metallized layer disposed on the substrate adjacent to the reference diode to block the incident light from impinging on the reference diode.

6. The sensor device of claim 4,
wherein the photodiode array is arranged in a 1×N dimensional area, where N is the number of the reference and monitoring photodiodes in the array, and where N is an integer greater than 1.

7. The sensor device of claim 4,
wherein the photodiode array is arranged in a M×N dimensional area, where N is the number of the monitoring and reference diodes in each of M numbers of rows, where M and N are both integers greater than 1, the sensor device further comprising M reference diodes, each reference diode electrically connected in parallel with one of the M rows of monitoring photodiodes.

8. The sensor device of claim 1,
wherein the monitoring photodiodes and the reference diode are in a common anode configuration.

9. An optoelectronic module comprising:
a VCSEL array mounted on a base and comprising N VCSELs each for producing a modulated optical signal, where N is an integer greater than 1;
a diode array mounted on the base and comprising N monitoring photodiodes configured to operate in a voltage mode configuration in which each monitoring photodiode provides a voltage indicating an intensity of an incident light, the photodiode array further comprising a reference diode configured to produce reference voltages in response to respective reference currents supplied to the reference diode, where the reference diode and the N monitoring photodiodes are configured to have a like voltage-current relationship over a range of like temperature values, such that an optical power measurement can be determined from the measured voltage indicating the intensity of the incident light of each monitoring photodiode and the reference voltages and reference currents, independent of temperature; and
an optical assembly adjacent the base and configured to receive the modulated optical signals and produce from each a modulated output signal and a detection signal, the optical assembly comprising a first diffractive lens array and a second diffractive lens array, the first refractive lens array converting the modulated optical signals into the modulated output signals and the detection signals, the second refractive lens array coupling the detection signals into the optical signal coupling the detection signals into the optical signal monitoring photodiodes, wherein the optical assembly is configured to couple each of the detection signals to one of the N monitoring photodiodes.

10. The optoelectronic module of claim 9, wherein the optical assembly further comprises an array of N lenses each configured to couple one of the modulated optical signals to one of N fibers in a parallel array optical fiber.

11. The optoelectronic module of claim 10, further comprising a housing having a receptacle end for accepting a connector of the parallel array optical fiber, wherein the base and the optical assembly are mounted within the housing.

12. The optoelectronic module of claim 9, wherein the N monitoring photodiodes and the reference diode are in a common cathode configuration.

13. The optoelectronic module of claim 9, wherein the N monitoring photodiodes and the reference diode are in a common anode configuration.

* * * * *